US012516036B2

United States Patent
Hwang et al.

(10) Patent No.: US 12,516,036 B2
(45) Date of Patent: Jan. 6, 2026

(54) CRYSTAL FORM OF 3-(4-(BENZYLOXY)PHENYL)HEX-4-INOIC ACID DERIVATIVE

(71) Applicant: HYUNDAI PHARM CO., LTD., Cheonan-si (KR)

(72) Inventors: Jeong Un Hwang, Suwon-si (KR); Jin Woong Kim, Suwon-si (KR); Kyu Hwan Lee, Yongin-si (KR); Eun Young Kim, Hwaseong-si (KR); Su Kyoung Choi, Suwon-si (KR)

(73) Assignee: HYUNDAI PHARM CO., LTD., Cheonan-si (KR)

( * ) Notice: Subject to any disclaimer, the term of this patent is extended or adjusted under 35 U.S.C. 154(b) by 1073 days.

(21) Appl. No.: 17/613,983

(22) PCT Filed: May 29, 2020

(86) PCT No.: PCT/KR2020/007018
§ 371 (c)(1),
(2) Date: Nov. 24, 2021

(87) PCT Pub. No.: WO2020/242252
PCT Pub. Date: Dec. 3, 2020

(65) Prior Publication Data
US 2022/0213051 A1    Jul. 7, 2022

(30) Foreign Application Priority Data

May 31, 2019    (KR) .................. 10-2019-0064586

(51) Int. Cl.
*C07D 317/72* (2006.01)

(52) U.S. Cl.
CPC ........ *C07D 317/72* (2013.01); *C07B 2200/13* (2013.01)

(58) Field of Classification Search
CPC .................................................. C07D 317/72
USPC ...................................................... 514/462
See application file for complete search history.

(56) References Cited

U.S. PATENT DOCUMENTS

| | | | |
|---|---|---|---|
| 7,851,476 B2 | 12/2010 | Chen et al. | |
| 9,139,542 B2 | 9/2015 | Zhang et al. | |
| 9,969,723 B2 | 5/2018 | Yang et al. | |
| 10,821,110 B2 | 11/2020 | Yang et al. | |
| 2005/0191614 A1 | 9/2005 | Cima et al. | |
| 2006/0134109 A1 | 6/2006 | Gaitanaris et al. | |
| 2013/0045990 A1 | 2/2013 | Hamdouchi | |
| 2014/0275554 A1 | 9/2014 | Zhang et al. | |
| 2016/0024063 A1 | 1/2016 | Yang et al. | |
| 2017/0112817 A1 | 4/2017 | Kwon et al. | |
| 2017/0296539 A1 | 10/2017 | Yang et al. | |
| 2020/0039957 A1 | 2/2020 | Miwatashi et al. | |
| 2024/0197674 A1 | 6/2024 | Yoo et al. | |

FOREIGN PATENT DOCUMENTS

| | | |
|---|---|---|
| EA | 014706 B1 | 2/2011 |
| EA | 027911 B1 | 9/2017 |
| EP | 3156055 A1 | 4/2017 |
| JP | 2003519698 A | 6/2003 |
| KR | 20060093564 A | 8/2006 |
| KR | 20140126248 A | 10/2014 |
| KR | 20150126368 A | 11/2015 |
| KR | 20160046306 A | 4/2016 |
| KR | 101666659 B1 | 10/2016 |
| RU | 2628077 C2 | 8/2017 |
| RU | 2680248 C1 | 2/2019 |
| WO | 0151919 A2 | 7/2001 |
| WO | 2006090999 A1 | 8/2006 |
| WO | 2014171762 A1 | 10/2014 |
| WO | 2018182050 A1 | 10/2018 |
| WO | 2019108046 A1 | 6/2019 |
| WO | 2020242252 A1 | 12/2020 |

OTHER PUBLICATIONS

Wang, Siling, editor-in-chief: "Physical Pharmacy", vol. 1, Chemical Industry Press, pp. 17-18 (English machine translation provided).
English translation of International Search Report corresponding to International Patent Application No. PCT/KR2020/007018 (3 pages) (mailed Sep. 4, 2020).
Morrison et al. "Development of a Suitable Salt Form for a GPR40 Receptor Agonist" Organic Process Research & Development, 15:104-111 (2011).
Caira, Mino R. "Crystalline polymorphism of organic compounds" Topics in Current Chemistry, Springer Verlag Berlin Heidelberg, 1998, V.198, p. 163-208 (cTp. 164-166, Section 3.1-3.2).
Hilfiker R (Editor) Ed—Hilfiker R: "Polymorphism in the Pharmaceutical Industry", Jan. 1, 2006 (Jan. 1, 2006), Jan. 1, 2006, pp. 1-19, XP002528052, ISBN: 978-3-527-31146-0.
Mitkina et al. "Stress studies and photostability as a part of pharmaceutical drug development data" Scientific Centre for Expert Evaluation of Medicinal Products Bulletin 2015; (2): 9-12 (English translation of the Abstract).
Morissette et al. "High-throughput crystallization: polymorphs, salts, co-crystals and solvates of pharmaceutical solids", Advanced Drug Delivery Reviews, 2004, v.56, pp. 275-300 ((section 1).
Smirnova et al. "Implementation of the Quality of Substances on Pharmacokinetic of Medicinal Products" Chapter 11, Clinical pharmacokinetics: theoretical, applied and analytical aspects: guide / Ed. V.G. Kukes—2009.—432 s.
Variankav et al. "From form to function: Crystallization of active pharmaceutical ingredients", AIChE, 2008, vol. 54(7), p. 1682-1688 (p. 1682 "Crystal Form"; doi: 10.1002/aic.11555).
Search report for Russian Application No. 2021134968 (Oct. 20, 2023) (3 pages).

(Continued)

Primary Examiner — Kahsay Habte
(74) Attorney, Agent, or Firm — Myers Bigel, P.A.

(57) ABSTRACT

The present invention relates to a novel crystal form of a 3-(4-(benzyloxy)phenyl)hex-4-inoic acid derivative, a preparation method therefore and a pharmaceutical composition comprising same. A crystal form I of a compound of chemical formula 1, according to the present invention, exhibits more excellent physicochemical properties such as thermal stability, static electricity-inducing capability, compressibility, etc. compared to an amorphous form or a crystal form II, and thus is especially useful for preparation and long-term storage.

11 Claims, 14 Drawing Sheets

(56) References Cited

OTHER PUBLICATIONS

English translation of International Search Report corresponding to International Patent Application No. PCT/KR2022/003384 (4 pages) (mailed Jun. 15, 2022).
Extended European Search Report corresponding to European Patent Application No. 22781424.1 (11 pages) (dated Feb. 3, 2025).
Hamdouchi et al. "The Discovery, Preclinical, and Early Clinical Development of Potent and Selective GPR40 Agonists for the Treatment of Type 2 Diabetes Mellitus (LY2881835, LY2922083, and LY2922470)" Journal of Medicinal Chemistry, 59:10891-10916 (2016).
"Brief Course in Molecular Pharmacology" edited by P. V. Sergeev, Moscow, 1975, p. 10.
Alekseev, V., "Optical isometry and pharmacological activity of drugs", Soros Educational Journal, 1998, vol. 1, pp. 49-55.
Kholodov, et al., "Clinical Pharmacokinetics", Moscow: Medicine, 1985, pp. 83-98, 134-138, 160, 378-380.
Makary, et al., "Principles of salt formation", UK Journal of Pharmaceutical and Biosciences, 2014, vol. 2, No. 4, pp. 1-4.
Vasilenko, et al., "Optical isomers in pharmaceuticals", Development and Registration of Medicines, 2015, vol. 1, pp. 92-97.

CRYSTAL FORM OF 3-(4-(BENZYLOXY)PHENYL)HEX-4-INOIC ACID DERIVATIVE

TECHNICAL FIELD

The present invention relates to a novel crystal form of a 3-(4-(benzyloxy)phenyl)hex-4-inoic acid derivative of the following Chemical Formula 1.

[Chemical Formula 1]

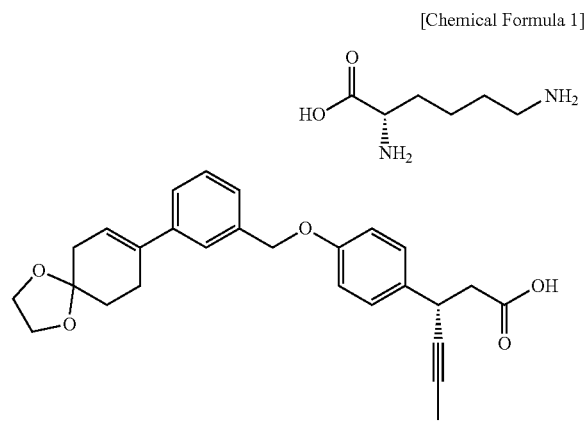 [SMILES: NCCCC[C@H](N)C(=O)O ; CC#C[C@@H](CC(=O)O)c1ccc(OCc2cccc(C3=CCC4(CC3)OCCO4)c2)cc1]

BACKGROUND ART

Various crystal or amorphous forms are able to exhibit various physical properties of a solid state, such as hygroscopicity, behavior against compression, stability during storage, and flowability of the milled solid. These properties in turn affect the suitability of a certain solid state as an active pharmaceutical substance for commercial production. For example, flowability affects the ease of handling a substance during processing into a pharmaceutical product. When the particles of the powdered compound do not readily flow past each other, the formulation expert will have to take that fact into account when developing a tablet or capsule preparation, and this may require the use of a glidant such as colloidal silicon dioxide, talc, starch, or tribasic calcium phosphate.

Different crystal or amorphous forms of the same drug may have substantial differences in pharmaceutically important properties such as a dissolution rate and bioavailability. The dissolution rate is not only considered when formulating syrups, elixirs, and other liquid medicaments, but may also vary the outcome of treatment. For example, the rate of dissolution of an active ingredient in a patient's gastric juice will vary the outcome of treatment as it places an upper limit on the rate at which an orally-administered active ingredient can reach the patient's bloodstream.

Meanwhile, the compound of Chemical Formula 1, (3S)-3-(4-(3-(1,4-dioxaspiro[4,5]dec-7-en-8-yl)benzyloxy)phenyl)hex-4-inoic acid and an L-lysine salt, which is disclosed in International Patent Publication No. WO2014-171762, is a substance that activates free fatty acid receptor 1 (FFAR1)/a G-protein coupled receptor (GPR40) to increase the intracellular calcium concentration and exhibit an excellent blood sugar lowering effect.

The inventors of the present invention have continuously conducted research on the crystal form of the compound of Chemical Formula 1 during development of a product of the compound of Chemical Formula 1. As a result, the inventors of the present invention have found that a crystal form I and a crystal form II are present as the crystal forms of the compound of Chemical Formula 1 and the crystal form I exhibits excellent physicochemical properties compared to the crystal form II or an amorphous form.

DISCLOSURE

Technical Problem

The present invention is directed to providing a crystal form I of a compound of Chemical Formula 1 which exhibits excellent physicochemical properties compared to an amorphous form and crystal form II of the compound of Chemical Formula 1.

The present invention is also directed to providing a method of preparing the crystal form I of the compound of Chemical Formula 1.

The present invention is also directed to providing a pharmaceutical composition including the crystal form I of the compound of Chemical Formula 1 as an active ingredient.

Technical Solution

One aspect of the present invention provides a crystal form I of a compound of Chemical Formula 1 which exhibits excellent physicochemical properties compared to an amorphous form and crystal form II of the compound of Chemical Formula 1.

According to powder X-ray diffraction (PXRD) analysis, the crystal form I and the crystal form II have different crystal structures.

According to an embodiment of the present invention, the crystal form I of the compound of Chemical Formula 1 exhibits an X-ray powder diffraction pattern having 4 or more diffraction peaks, for example, 4, 5, 6, 7, 8, 9, 10 or more diffraction peaks, at 2[θ] values selected from 4.61±0.2, 5.49±0.2, 6.84±0.2, 11.74±0.2, 12.05±0.2, 13.74±0.2, 16.50±0.2, 16.94±0.2, 18.45±0.2, 19.11±0.2, 20.13±0.2, 20.42±0.2, 20.87±0.2, 21.57±0.2, 23.04±0.2, and 25.02±0.2.

Particularly, the X-ray powder diffraction pattern has diffraction peaks at 2[θ] values selected from 4.61±0.2, 6.84±0.2, 11.74±0.2, 16.50±0.2, 16.94±0.2, 20.42±0.2, and 20.87±0.2.

More specifically, the crystal form I of the compound of Chemical Formula 1 exhibits an X-ray powder diffraction pattern where the positions of peaks match the peak positions listed in the following Table 1.

TABLE 1

| Caption | Angle 2-Theta ° | d value Angstrom | Intensity Count | Intensity % % |
|---|---|---|---|---|
| d = 19.14506 | 4.612 | 19.14506 | 4735 | 89.4 |
| d = 16.07776 | 5.492 | 16.07776 | 2226 | 42 |
| d = 12.91070 | 6.841 | 12.9107 | 3738 | 70.6 |
| d = 7.53027 | 11.743 | 7.53027 | 5231 | 98.8 |
| d = 7.33717 | 12.053 | 7.33717 | 5296 | 100 |
| d = 6.44222 | 13.735 | 6.44222 | 4485 | 84.7 |
| d = 5.36804 | 16.501 | 5.36804 | 5215 | 98.5 |
| d = 5.22939 | 16.941 | 5.22939 | 4947 | 93.4 |
| d = 4.80573 | 18.447 | 4.80573 | 4289 | 81 |
| d = 4.64015 | 19.112 | 4.64015 | 4100 | 77.4 |
| d = 4.40719 | 20.132 | 4.40719 | 4188 | 79.1 |
| d = 4.34614 | 20.418 | 4.34614 | 4519 | 85.3 |
| d = 4.25406 | 20.865 | 4.25406 | 4692 | 88.6 |

TABLE 1-continued

| Caption | Angle 2-Theta ° | d value Angstrom | Intensity Count | Intensity % |
|---|---|---|---|---|
| d = 4.11754 | 21.565 | 4.11754 | 3688 | 69.6 |
| d = 3.85747 | 23.038 | 3.85747 | 3021 | 57 |
| d = 3.55665 | 25.016 | 3.55665 | 2478 | 46.8 |

Meanwhile, a crystal form II of the compound of Chemical Formula 1 exhibits an X-ray powder diffraction pattern having 4 or more diffraction peaks, for example, 4, 5, 6, 7, 8, 9, 10 or more diffraction peaks, at 2[θ] values selected from 4.71±0.2, 5.47±0.2, 7.17±0.2, 8.21±0.2, 10.56±0.2, 10.99±0.2, 11.23±0.2, 13.75±0.2, 14.20±0.2, 15.01±0.2, 15.19±0.2, 15.74±0.2, 16.24±0.2, 17.32±0.2, 18.37±0.2, 19.33±0.2, 20.54±0.2, 20.86±0.2, 21.20±0.2, 21.49±0.2, 22.05±0.2, 22.76±0.2, 23.26±0.2, 23.64±0.2, 24.94±0.2, 25.80±0.2, and 27.13±0.2.

Particularly, the X-ray powder diffraction pattern has diffraction peaks at 2[θ] values selected from 5.47±0.2, 8.21±0.2, 10.99±0.2, 13.75±0.2, 16.24±0.2, 19.33±0.2, 22.05±0.2, 23.26±0.2, and 24.94±0.2.

More specifically, the crystal form II of the compound of Chemical Formula 1 exhibits an X-ray powder diffraction pattern where the positions of peaks match the peak positions listed in the following Table 2.

TABLE 2

| Caption | Angle 2-Theta ° | d value Angstrom | Intensity Count | Intensity % |
|---|---|---|---|---|
| d = 18.76189 | 4.706 | 18.76189 | 2391 | 4.5 |
| d = 16.14857 | 5.468 | 16.14857 | 53225 | 100 |
| d = 12.32326 | 7.168 | 12.32326 | 2162 | 4.1 |
| d = 10.76005 | 8.211 | 10.76005 | 6871 | 12.9 |
| d = 8.36753 | 10.564 | 8.36753 | 3725 | 7 |
| d = 8.04414 | 10.99 | 8.04414 | 4743 | 8.9 |
| d = 7.87443 | 11.228 | 7.87443 | 4518 | 8.5 |
| d = 6.43328 | 13.754 | 6.43328 | 5358 | 10.1 |
| d = 6.23107 | 14.202 | 6.23107 | 4632 | 8.7 |
| d = 5.89634 | 15.013 | 5.89634 | 4846 | 9.1 |
| d = 5.82937 | 15.187 | 5.82937 | 4655 | 8.7 |
| d = 5.62647 | 15.738 | 5.62647 | 4364 | 8.2 |
| d = 5.45309 | 16.241 | 5.45309 | 4588 | 8.6 |
| d = 5.11531 | 17.322 | 5.11531 | 4097 | 7.7 |
| d = 4.82690 | 18.366 | 4.8269 | 4278 | 8 |
| d = 4.58880 | 19.327 | 4.5888 | 4591 | 8.6 |
| d = 4.31979 | 20.544 | 4.31979 | 3784 | 7.1 |
| d = 4.25466 | 20.862 | 4.25466 | 3887 | 7.3 |
| d = 4.18814 | 21.197 | 4.18814 | 3951 | 7.4 |
| d = 4.13240 | 21.486 | 4.1324 | 3606 | 6.8 |
| d = 4.02748 | 22.053 | 4.02748 | 4152 | 7.8 |
| d = 3.90318 | 22.764 | 3.90318 | 2799 | 5.3 |
| d = 3.82080 | 23.262 | 3.8208 | 3260 | 6.1 |
| d = 3.76015 | 23.642 | 3.76015 | 2557 | 4.8 |
| d = 3.56797 | 24.936 | 3.56797 | 2831 | 5.3 |
| d = 3.45025 | 25.801 | 3.45025 | 2478 | 4.7 |
| d = 3.28407 | 27.131 | 3.28407 | 2309 | 4.3 |

Another aspect of the present invention provides a method of preparing the crystal form I of the compound of Chemical Formula 1, which comprises dissolving (3S)-3-(4-(3-(1,4-dioxaspiro[4,5]dec-7-en-8-yl)benzyloxy)phenyl)hex-4-inoic acid and an L-lysine salt in methanol, adding isopropyl acetate, and obtaining a crystal form I of a compound of Chemical Formula 1 from the reaction product. Still another aspect of the present invention provides a pharmaceutical composition for preventing or treating a metabolic disease, which comprises the crystal form of the compound of Chemical Formula 1 and a pharmaceutically acceptable carrier.

The compound of Chemical Formula 1 is known to activate the GPR40 enzyme. GPR40 is a G-protein coupled receptor (GPCR) mainly expressed in the insulin-secreting cells of the pancreas, and the GPR40 expression profile is potentially useful for the treatment of various metabolic diseases including obesity and diabetes.

The compound of Chemical Formula 1 according to the present invention has an excellent insulin secretion promoting effect due to having an excellent effect of activating the GPR40 protein, is able to be administered in combination with other drugs, and has a very good effect of activating the GPR40 protein in vivo. Therefore, a composition containing the compound as an active ingredient can be usefully used as a pharmaceutical composition for preventing or treating a metabolic disease such as obesity, type I diabetes, type II diabetes, impaired glucose tolerance, insulin resistance, hyperglycemia, hyperlipidemia, hypertriglyceridemia, hypercholesterolemia, dyslipidemia, syndrome X, and the like.

The compound of Chemical Formula 1 according to the present invention may be administered in various oral and parenteral formulations upon clinical administration. For formulation, the compound may be prepared using a commonly used diluent or excipient such as a filler, an extending agent, a binding agent, a wetting agent, a disintegrating agent, a surfactant, and the like.

A solid preparation for oral administration includes a tablet, a pill, a powder, a granule, a capsule, a troche, and the like, and such a solid preparation is prepared by mixing one or more compounds according to the present invention with one or more excipients, for example, starch, calcium carbonate, sucrose or lactose, gelatin, and the like. Also, in addition to the simple excipient, a lubricant such as magnesium stearate, talc, and the like is used. A liquid preparation for oral administration includes a suspension, a liquid for internal use, an emulsion, a syrup, and the like. In this case, in addition to a commonly used simple diluent such as water and liquid paraffin, various excipients such as a wetting agent, a sweetening agent, an aromatic, a preservative, and the like may be included.

A preparation for parenteral administration includes a sterile aqueous solution, a non-aqueous solvent, a suspension, an emulsion, a lyophilized preparation, and a suppository, and the like. As the non-aqueous solvent and the suspension, propylene glycol, polyethylene glycol, a vegetable oil (such as olive oil), an injectable ester (such as ethyl oleate), and the like may be used. As a suppository base, Witepsol, Macrogol, Tween 61, cacao butter, laurin fat, glycerol, gelatin, and the like may be used.

In addition, the effective dose of the compound of Chemical Formula 1 of the present invention to the human body may vary depending on the age, weight, and sex of a patient, dosage form, health status, and disease level, and is generally about 0.001 to 100 mg/kg/day, and preferably, 0.01 to 35 mg/kg/day. Based on an adult patient weighing 70 kg, the effective dose is generally 0.07 to 7000 mg/day, and preferably, 0.7 to 2500 mg/day, and may be administered once or several times a day at regular time intervals according to the judgment of a doctor or pharmacist.

Advantageous Effects

A crystal form I of a compound of Chemical Formula 1 according to the present invention exhibits more excellent physicochemical properties in terms of thermal stability, static electricity-inducing capability, compressibility, and the like compared to an amorphous form or a crystal form II and thus is particularly useful for formulation and long-term storage.

MODES OF THE INVENTION

Advantages and features of the present invention and methods for achieving the same will be apparent by the exemplary embodiments described below in detail. However, the present invention is not limited to the exemplary embodiments described below and may be implemented in various different forms. Rather, the exemplary embodiments have been provided to make the disclosure of the present invention thorough and complete and to fully inform the scope of the present invention to those of ordinary skill in the art to which the present invention pertains, and the present invention is defined only by the scope of the claims.

EXAMPLES

Example 1: Preparation of Crystal Form I of Compound of Chemical Formula 1

(3S)-3-(4-(3-(1,4-dioxaspiro[4,5]dec-7-en-8-yl)benzyloxy)phenyl)hex-4-inoic acid and L-lysine were added to methanol and then stirred. After the stirring at 60° C. for 30 minutes, the resultant was slowly cooled. A small amount of isopropyl acetate was added at 35° C. to form a solid. After stirring for 30 minutes after solid formation, more isopropyl acetate was added. After stirring at 25° C. for an hour, filtration was performed. The resultant was dried to obtain a crystal form of a compound of Chemical Formula 1.

Figure 1:
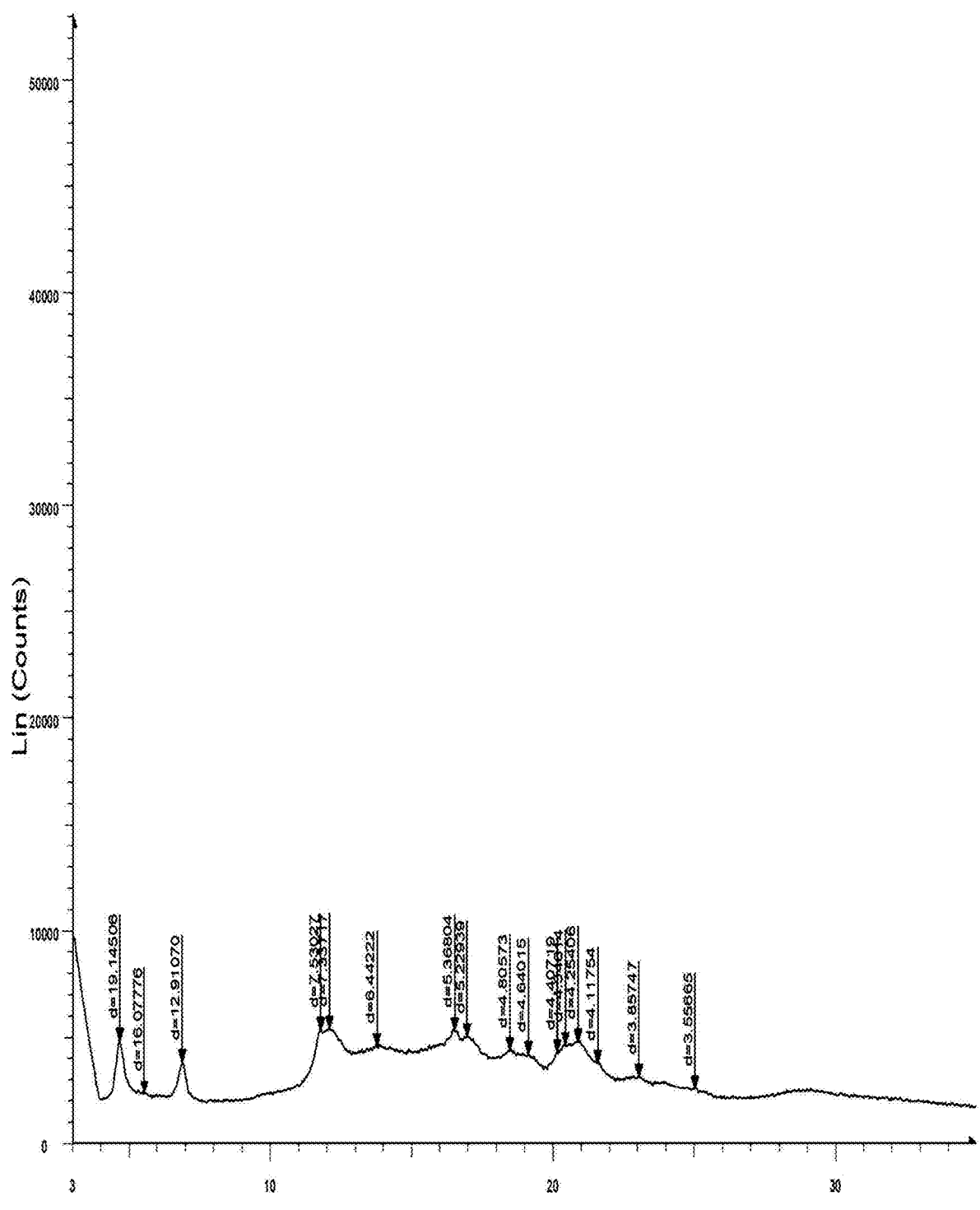
FIG. 1 shows an X-ray powder diffraction pattern of a crystal form I of a compound of Chemical Formula 1.

As a result of powder X-ray diffraction analysis, the crystal form was confirmed to have the XRD pattern of FIG. 1 and was referred to as crystal form I.

X-Ray Diffractometer (XRD) Conditions
1) Model: D8 Advance (Bruker)
2) Current/voltage/2 theta range/Rate: 40 Ma/40 KV/3-45/6 deg/min*7

Example 2: Preparation of Crystal Form II of Compound of Chemical Formula 1

(3S)-3-(4-(3-(1,4-dioxaspiro[4,5]dec-7-en-8-yl)benzyloxy)phenyl)hex-4-inoic acid and an L-lysine salt were dissolved in isopropyl alcohol and purified water. The resultant was filtered through a membrane filter and cooled. The resulting solid was scraped and then filtered. The resultant was dried to obtain a crystal form of a compound of Chemical Formula 1.

Figure 2:
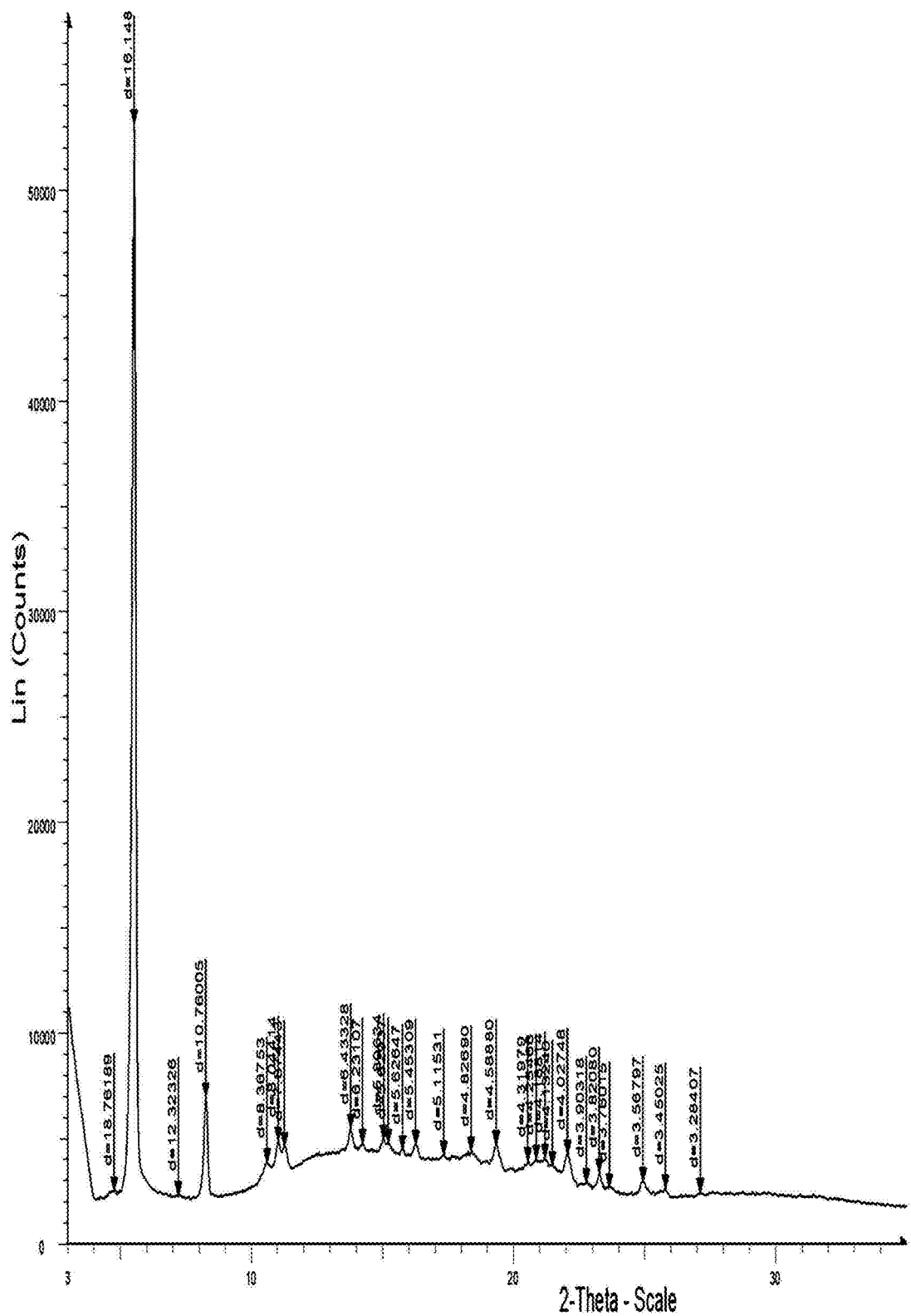
FIG. 2 shows an X-ray powder diffraction pattern of a crystal form II of a compound of Chemical Formula 1.

As a result of powder X-ray diffraction analysis, the crystal form was confirmed to have the XRD pattern of FIG. 2 and was referred to as crystal form II.

Example 3: Preparation of Amorphous Form of Compound of Chemical Formula 1

Figure 3:
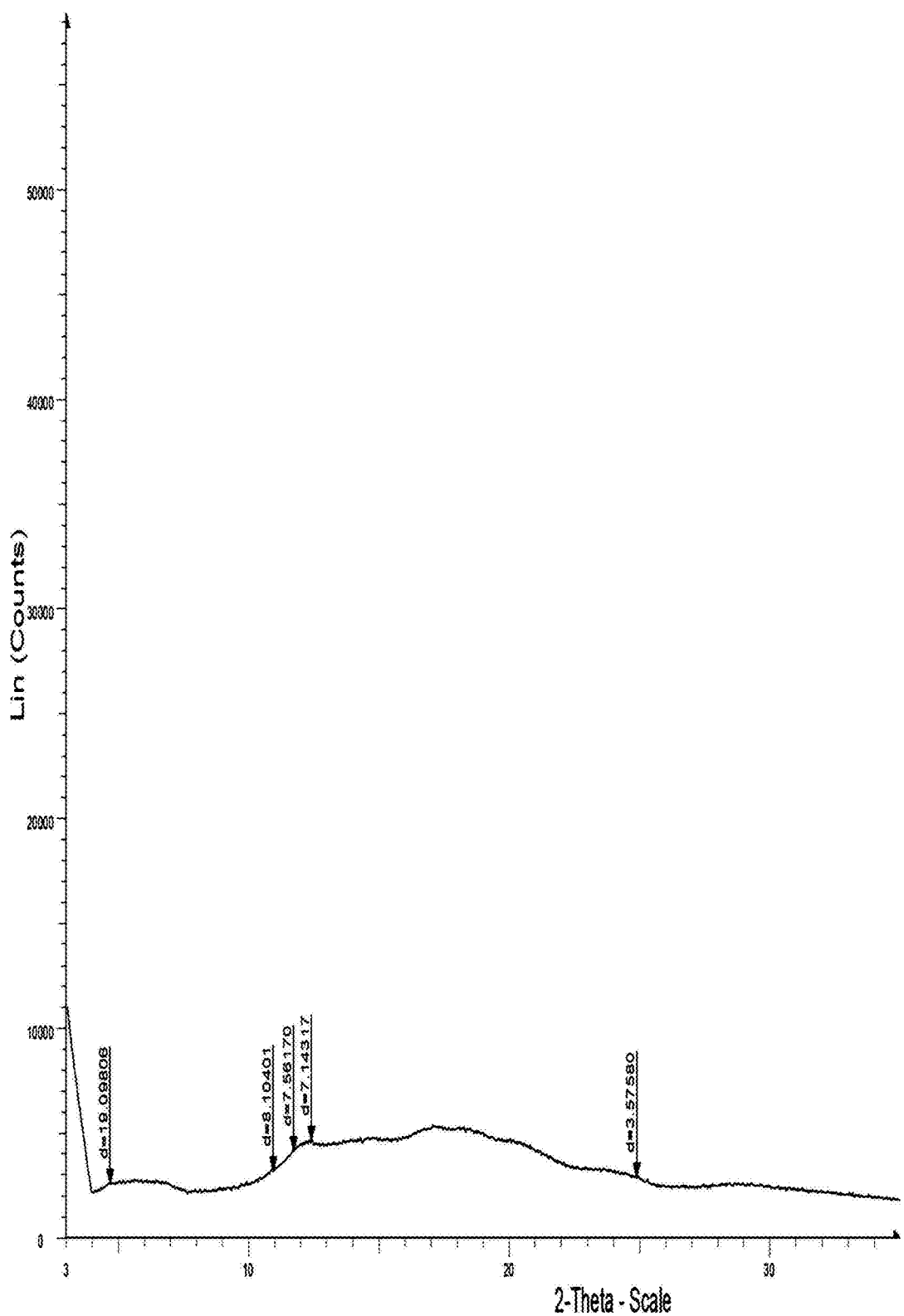
FIG. 3 shows an X-ray powder diffraction pattern of an amorphous form of a compound of Chemical Formula 1.

(3S)-3-(4-(3-(1,4-dioxaspiro[4,5]dec-7-en-8-yl)benzyloxy)phenyl)hex-4-inoic acid and an L-lysine salt were dissolved in methanol and isopropyl alcohol by heating at 60° C. The resultant was filtered through a membrane filter and cooled. The resulting solid was scraped and then filtered. The resultant was dried to obtain a powder of a compound of Chemical Formula 1. As a result of powder X-ray diffraction analysis, the powder was confirmed to have the XRD pattern of FIG. 3 and was referred to as an amorphous form.

Experimental Example 1: DSC Analysis of Crystal Form I of Compound of Chemical Formula 1

Figure 4:
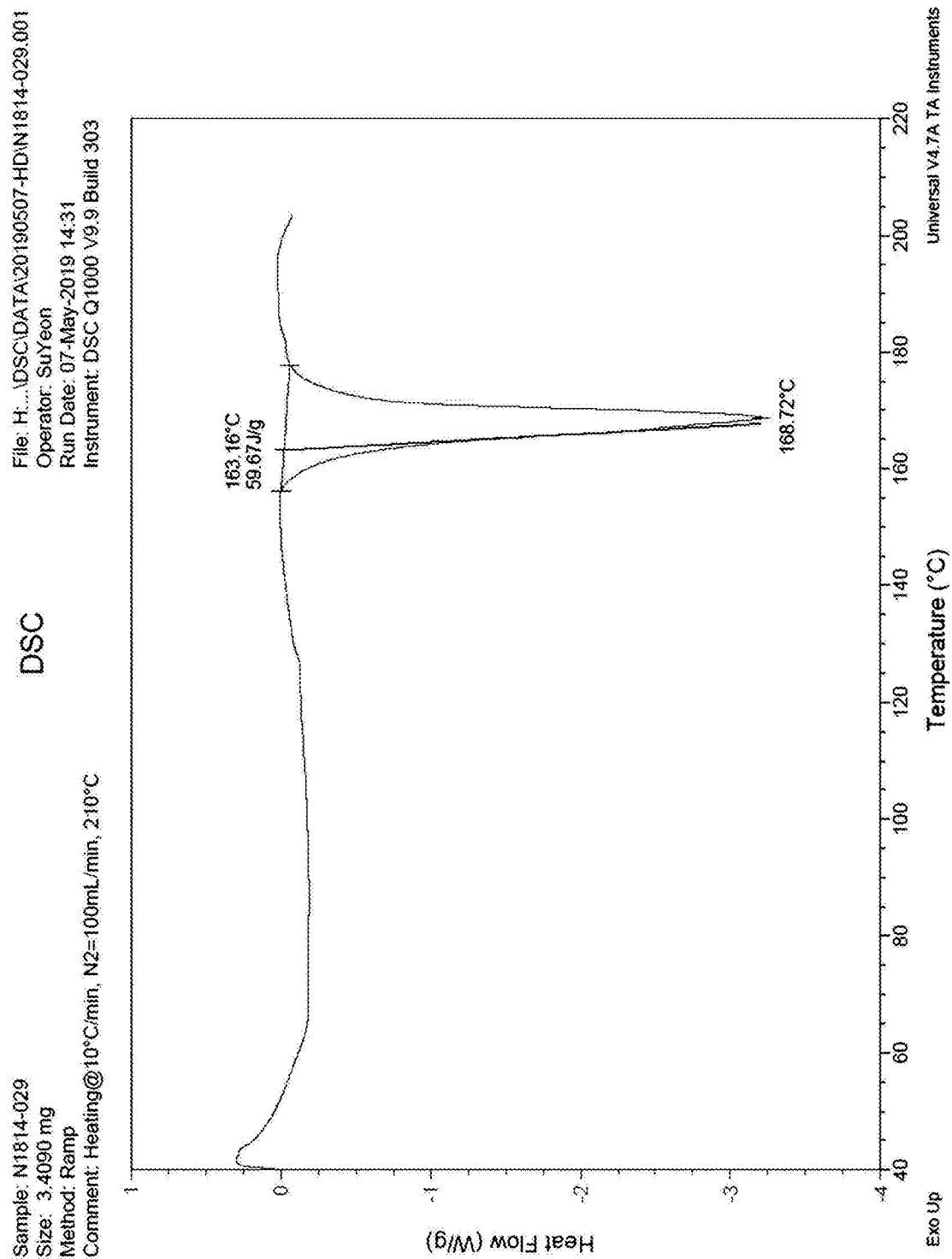
FIG. 4 shows the heat flow change of a crystal form I of a compound of Chemical Formula 1 according to temperature and elapsed time.

The crystal form I obtained in Example 1 was analyzed using an auto modulated differential scanning calorimeter (MDSC). MDSC analysis results are shown in FIG. 4.

Auto modulated differential scanning calorimeter (MDSC) conditions
1) Model: Q-1000 (TA)
2) Temperature range: 40° C.~210° C.
3) Rate: 20° C./min

Experimental Example 2: TGA/SDT Analysis of Crystal Form I of Compound of Chemical Formula 1

The crystal form I obtained in Example 1 was analyzed using a thermal analyzer (TGA/SDT).

Figure 5:
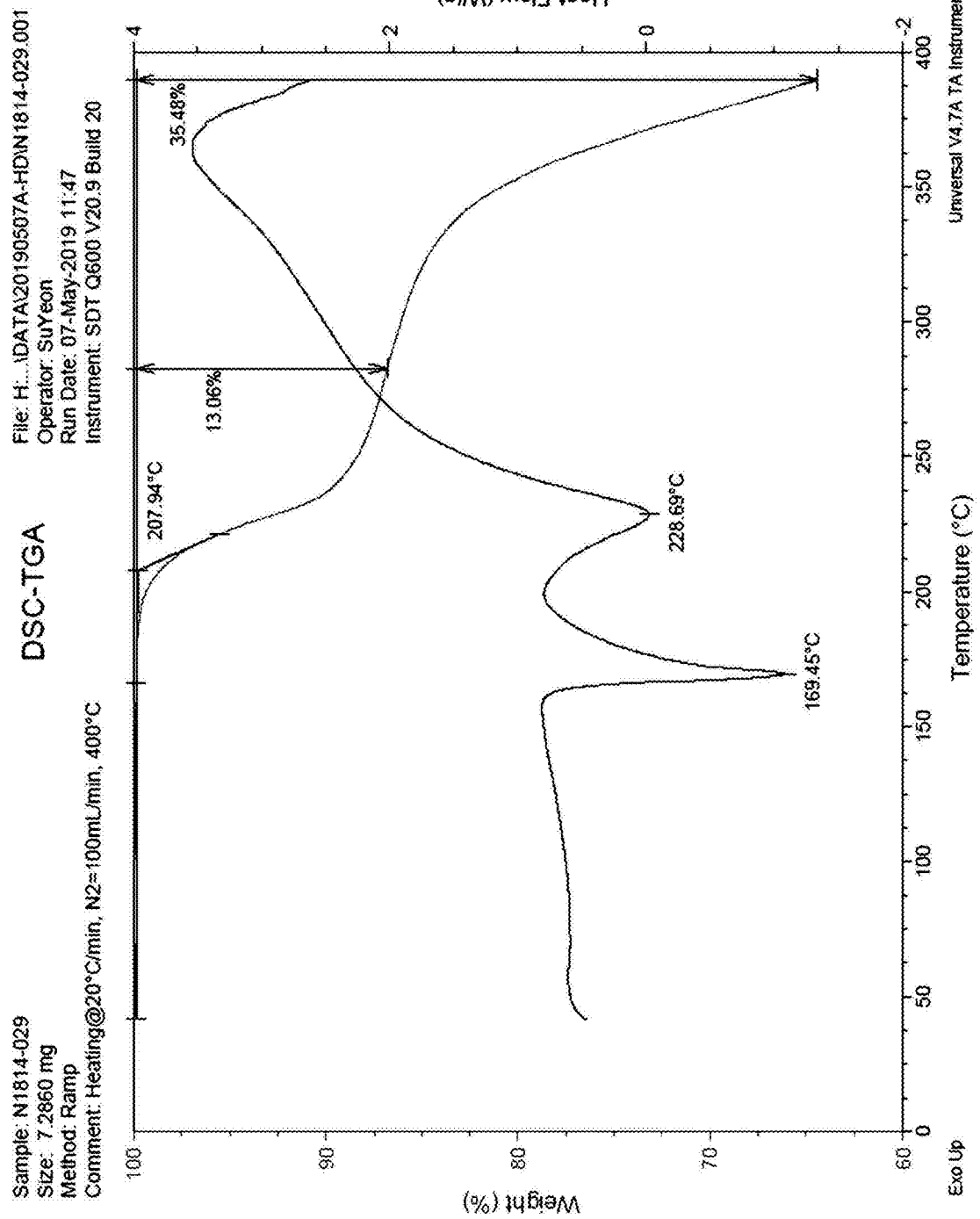
FIG. 5 shows the physical properties of a crystal form I of a compound of Chemical Formula 1 according to temperature or the properties of a reaction product as measured by a function of temperature or time.

Thermal Analyzer (TGA/SDT) Conditions
1) Model: TGA Q5000 IR/SDT Q600 (TA)
2) Temperature range: 4° C.~400° C.
3) Rate: 20° C./min
TGA/SDT analysis results are shown in FIG. 5.

Experimental Example 3: DSC Analysis of Crystal Form II of Compound of Chemical Formula 1

Figure 6:
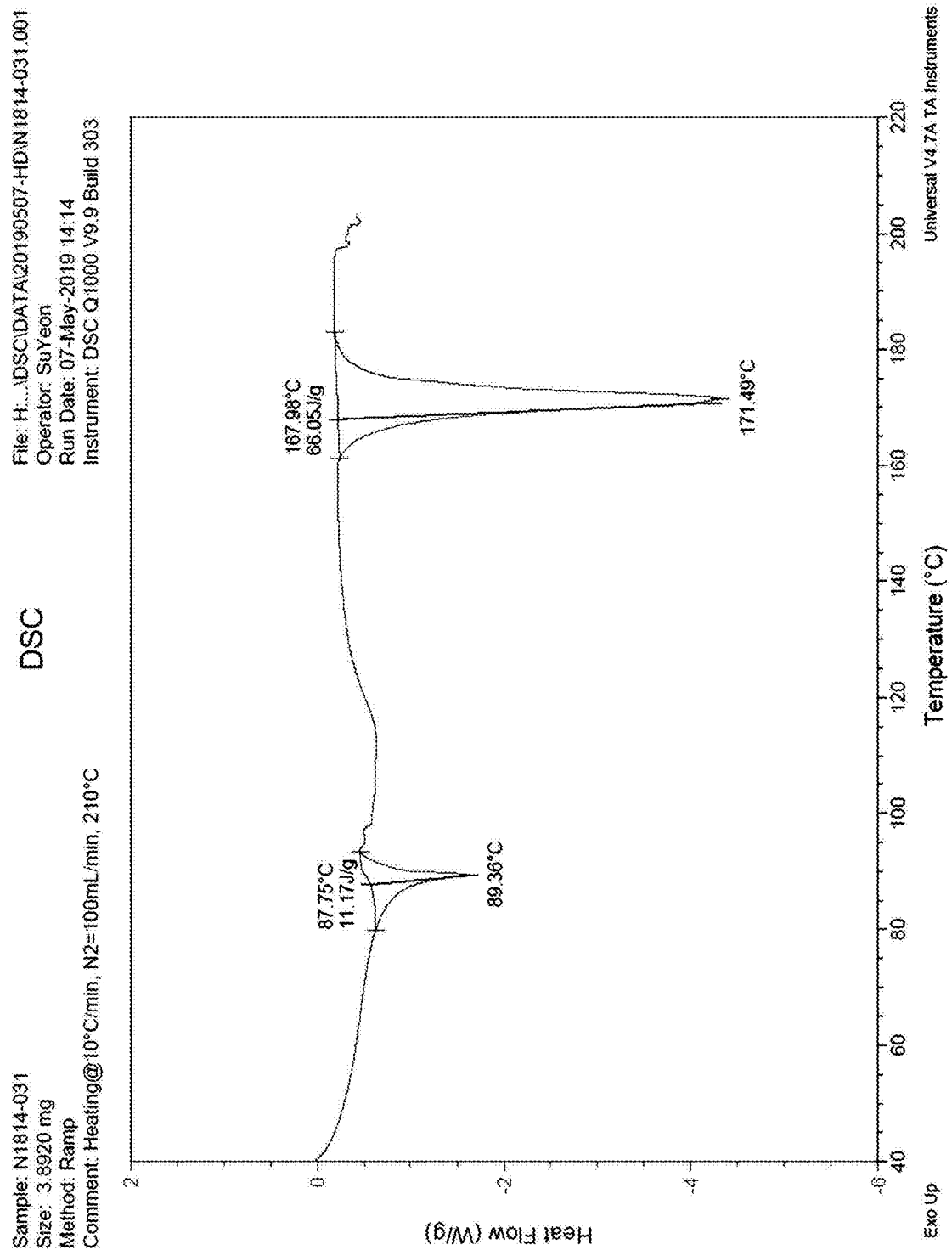
FIG. 6 shows the heat flow change of a crystal form II of a compound of Chemical Formula 1 according to temperature and elapsed time.

The crystal form II obtained in Example 2 was analyzed using an auto modulated differential scanning calorimeter (MDSC).
Auto Modulated Differential Scanning Calorimeter (MDSC) Conditions
1) Model: Q-1000 (TA)
2) Temperature range: 40° C.~210° C.
3) Rate: 20° C./min
MDSC analysis results are shown in FIG. 6.

Experimental Example 4: TGA/SDT Analysis of Crystal Form II of Compound of Chemical Formula 1

Figure 7:
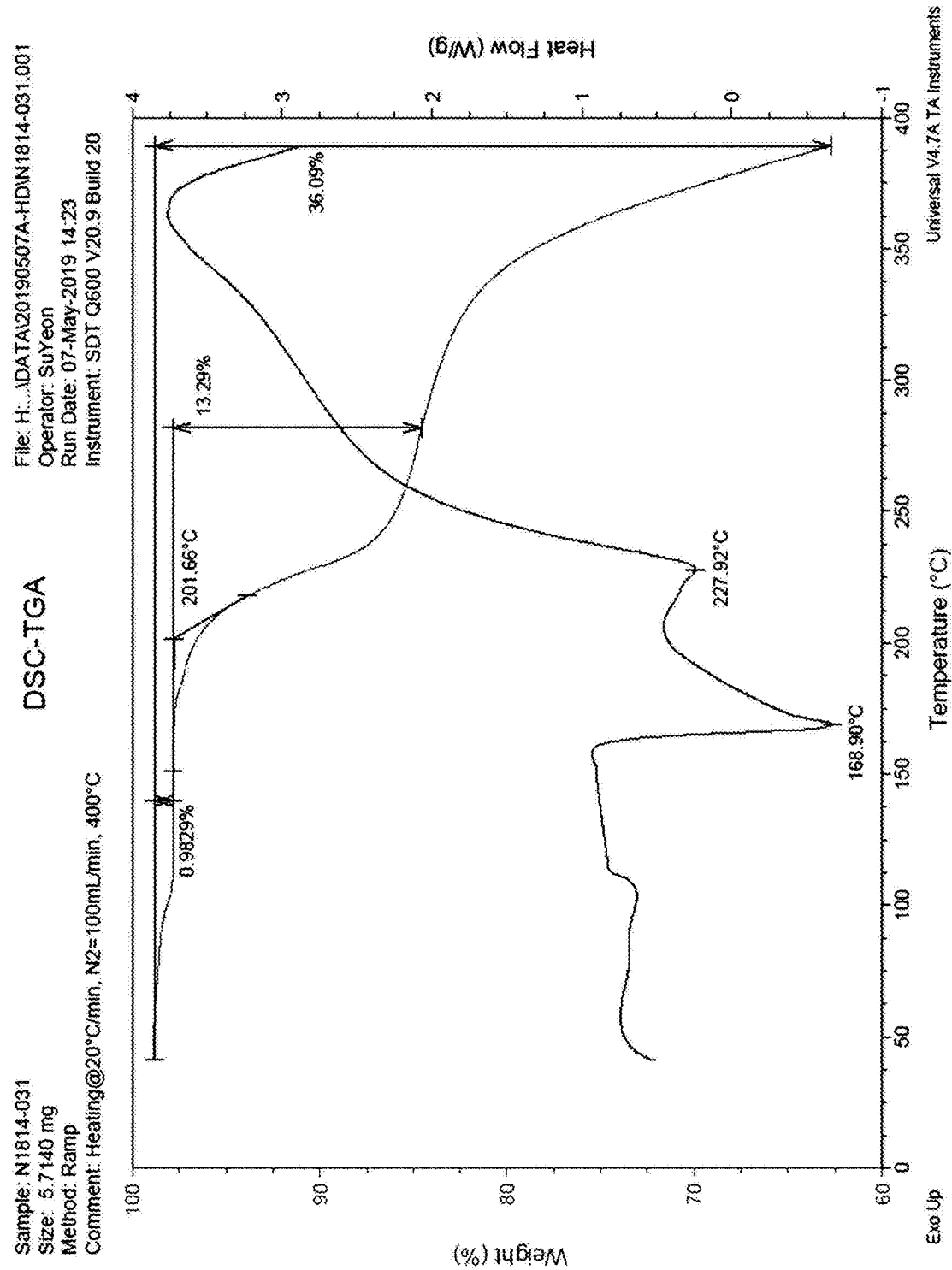
FIG. 7 shows the physical properties of a crystal form II of a compound of Chemical Formula 1 according to temperature or the properties of a reaction product as measured by a function of temperature or time.

The crystal form II obtained in Example 2 was analyzed using a thermal analyzer (TGA/SDT).
Thermal Analyzer (TGA/SDT) Conditions
1) Model: TGA Q5000 IR/SDT Q600 (TA)
2) Temperature range: 40° C.~400° C.
3) Rate: 20° C./min
TGA/SDT analysis results are shown in FIG. 7.

Experimental Example 5: DSC Analysis of Amorphous Form of Compound of Chemical Formula 1

Figure 8:
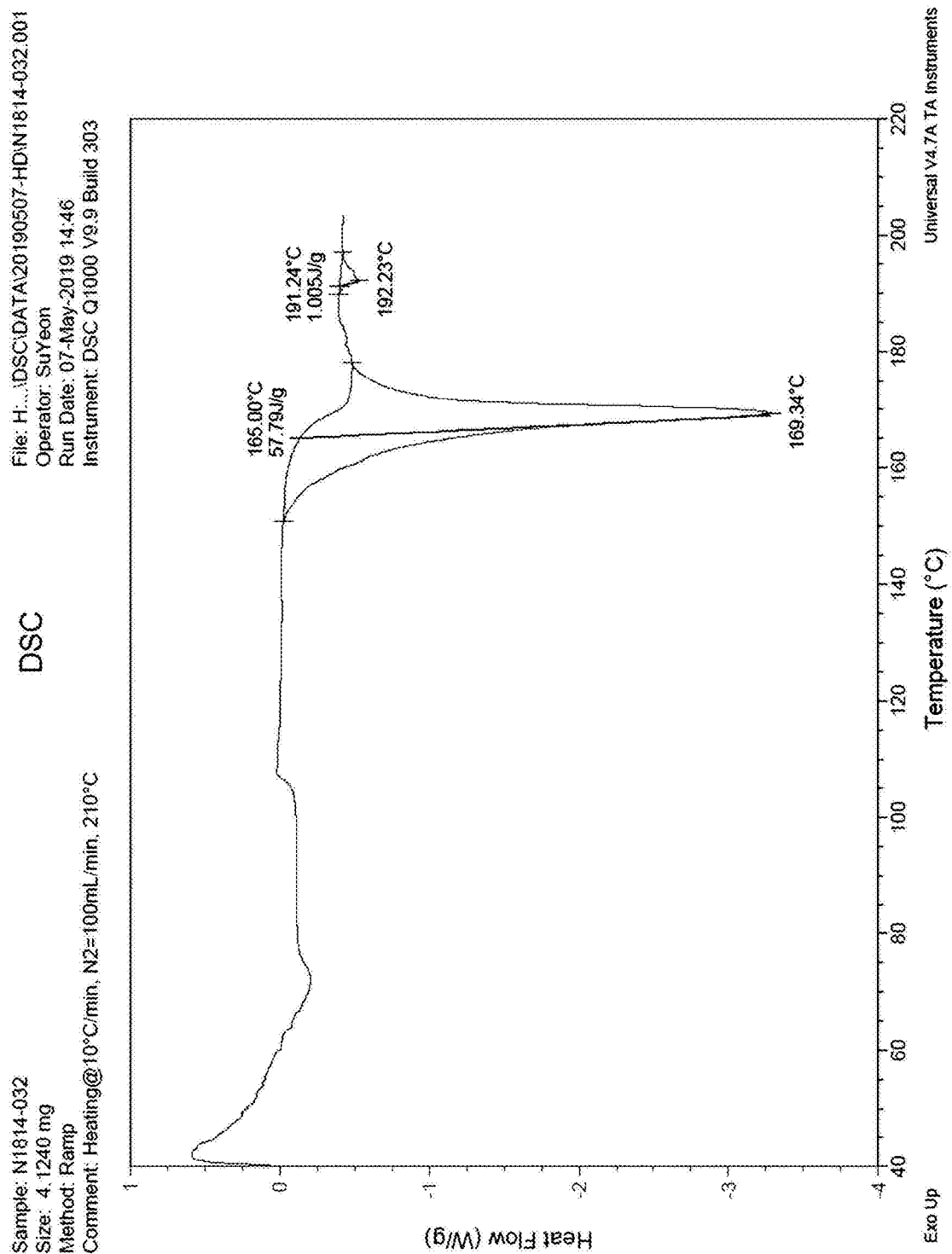
FIG. 8 shows the heat flow change of an amorphous form of a compound of Chemical Formula 1 according to temperature and elapsed time.

The amorphous form obtained in Example 3 was analyzed using an auto modulated differential scanning calorimeter (MDSC).
Auto Modulated Differential Scanning Calorimeter (MDSC) Conditions
1) Model: Q-1000 (TA)
2) Temperature range: 40° C.~210° C.
3) Rate: 20° C./min
MDSC analysis results are shown in FIG. 8.

Experimental Example 6: TGA/SDT Analysis of Amorphous Form of Compound of Chemical Formula 1

Figure 9:
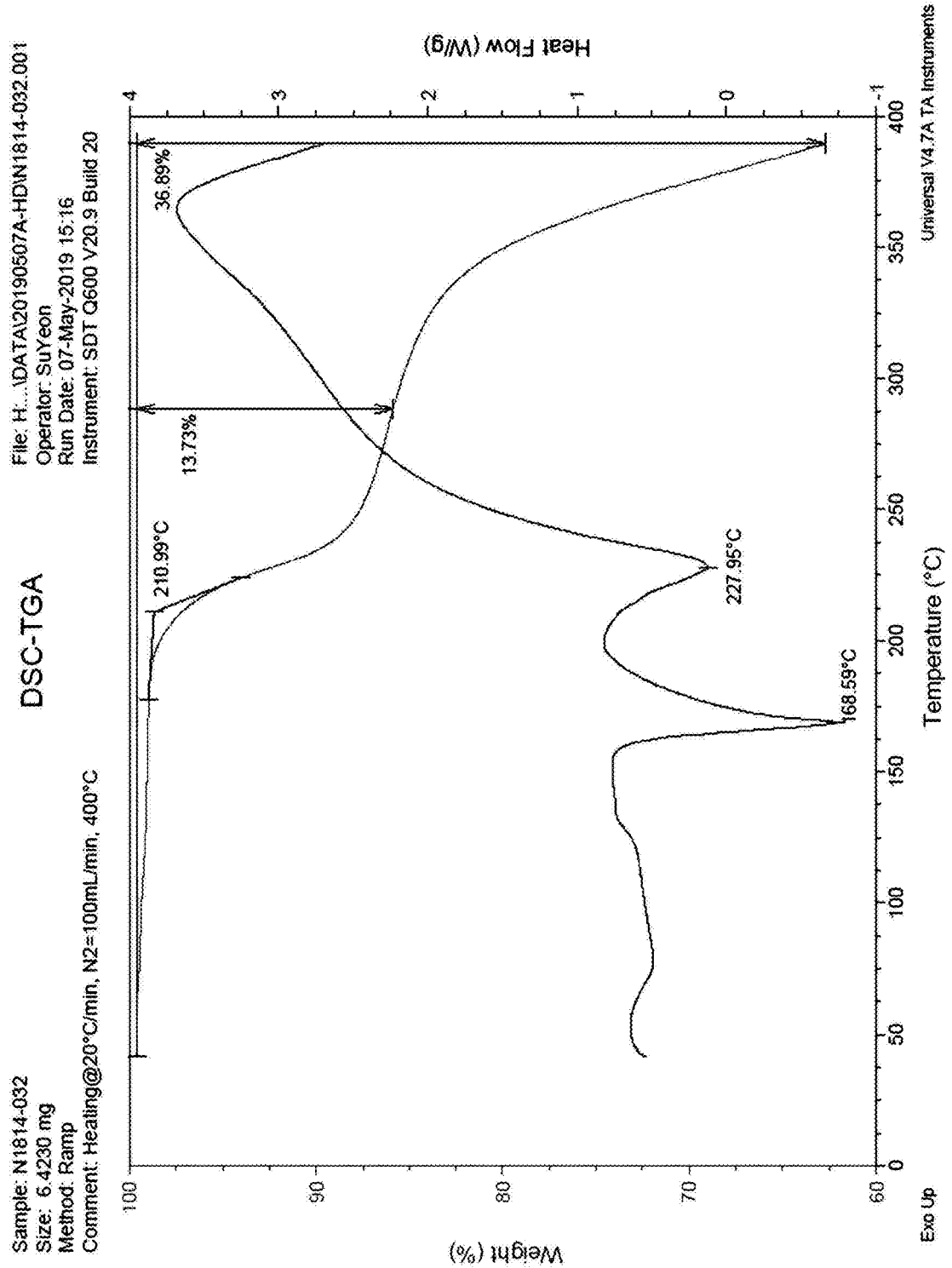
FIG. 9 shows the physical properties of an amorphous form of a compound of Chemical Formula 1 according to temperature or the properties of a reaction product as measured by a function of temperature or time.

The amorphous form obtained in Example 3 was analyzed using a thermal analyzer (TGA/SDT).
Thermal Analyzer (TGA/SDT) Conditions
1) Model: TGA Q5000 IR/SDT Q600 (TA)
2) Temperature range: 40° C.~400° C.
3) Rate: 20° C./min
TGA/SDT analysis results are shown in FIG. 9.

Experimental Example 7: Thermal Stability Test

The crystal form I, crystal form II, and amorphous form samples of a compound of Chemical Formula 1 were subjected to a thermal stability test.
0.3 g of each sample was input into a 20 mL vial (prepared 0.3 g*3 ea for each sample), and the vial was sealed by closing a lid and then allowed to stand in an oven set at 80° C. Afterward, the sample was taken out after 6 days, 14 days, and 1 month had elapsed, and the changes in properties, purity, and XRD pattern before and after thermal stress conditions were examined.

Purity was measured under the following conditions using a HPLC.
Column: YMC-Pack Pro C18, 5 um, 4.6×150 mm
Column temperature: 35° C.
Flow rate: 1.0 mL/min
Injection volume: 5 uL
Wavelength: 220 nm
Mobile Phase A: 0.1% TFA in $H_2O$/MeOH=60/40
Mobile Phase B: MeOH/0.1% TFA in ACN=60/40
Gradient:

| Time (min) | Mobile Phase A(%) | Mobile Phase B(%) |
|---|---|---|
| 0 | 80 | 20 |
| 3 | 80 | 20 |
| 25 | 10 | 90 |
| 30 | 10 | 90 |
| 30.10 | 80 | 20 |
| 40 | 80 | 20 |

Diluent: $H_2O$/ACN=80/20
Run time: 40 min
Sample concentration: 0.7 mg/mL

Figure 10:
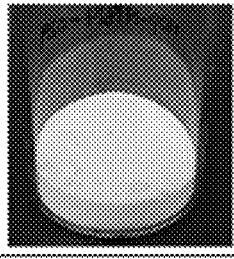
FIG. 10 is a photograph showing the change in properties related to the thermal stability of the crystal form I, crystal form II, and amorphous form of a compound of Chemical Formula 1 under thermal stress conditions.

As a result, as shown in FIG. 10, the crystal forms I and II showed no significant change in properties even after 1 month of the thermal stress test, whereas all of the amorphous form samples had already turned yellow after 6 days of the thermal stress test, indicating that thermal stability was significantly degraded.

In addition, as shown in Table 3, the purity of the amorphous form after 1 month of the thermal stress test was significantly degraded, whereas the purity of the crystal forms I and II were maintained at high levels.

TABLE 3

Purity change before and after thermal stress test

| | | Purity (%) | | | Purity change (%) Month 1 − |
|---|---|---|---|---|---|
| No. | Sample | Initial | Day 6 | Day 14 | Month 1 | Initial |
| 1 | Crystal form I | 99.40 | 98.67 | 97.91 | 95.75 | −3.65 |
| 2 | Crystal form II | 99.53 | 98.73 | 97.80 | 95.78 | −3.75 |
| 3 | Amorphous form | 99.33 | 96.76 | 94.35 | 87.64 | −11.69 |

Figure 11:
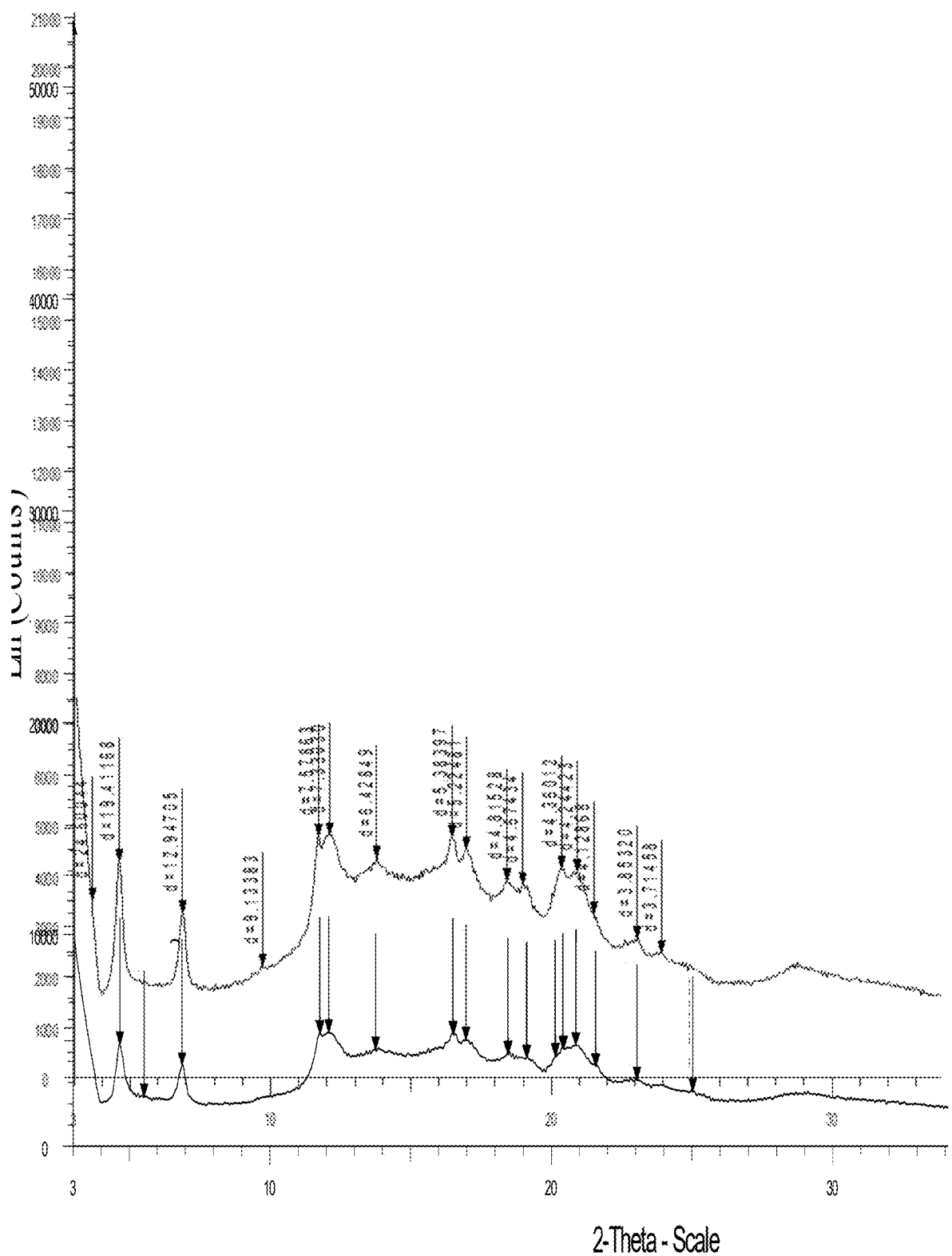
FIG. 11 is a graph showing the change in the XRD pattern of a crystal form I before (bottom, black) and after (top, orange) a stability test under thermal stress conditions.

FIG. 11 is a graph showing the change in the XRD pattern of a crystal form I before (bottom, black) and after (top, orange) a stability test under thermal stress conditions.

Figure 12:
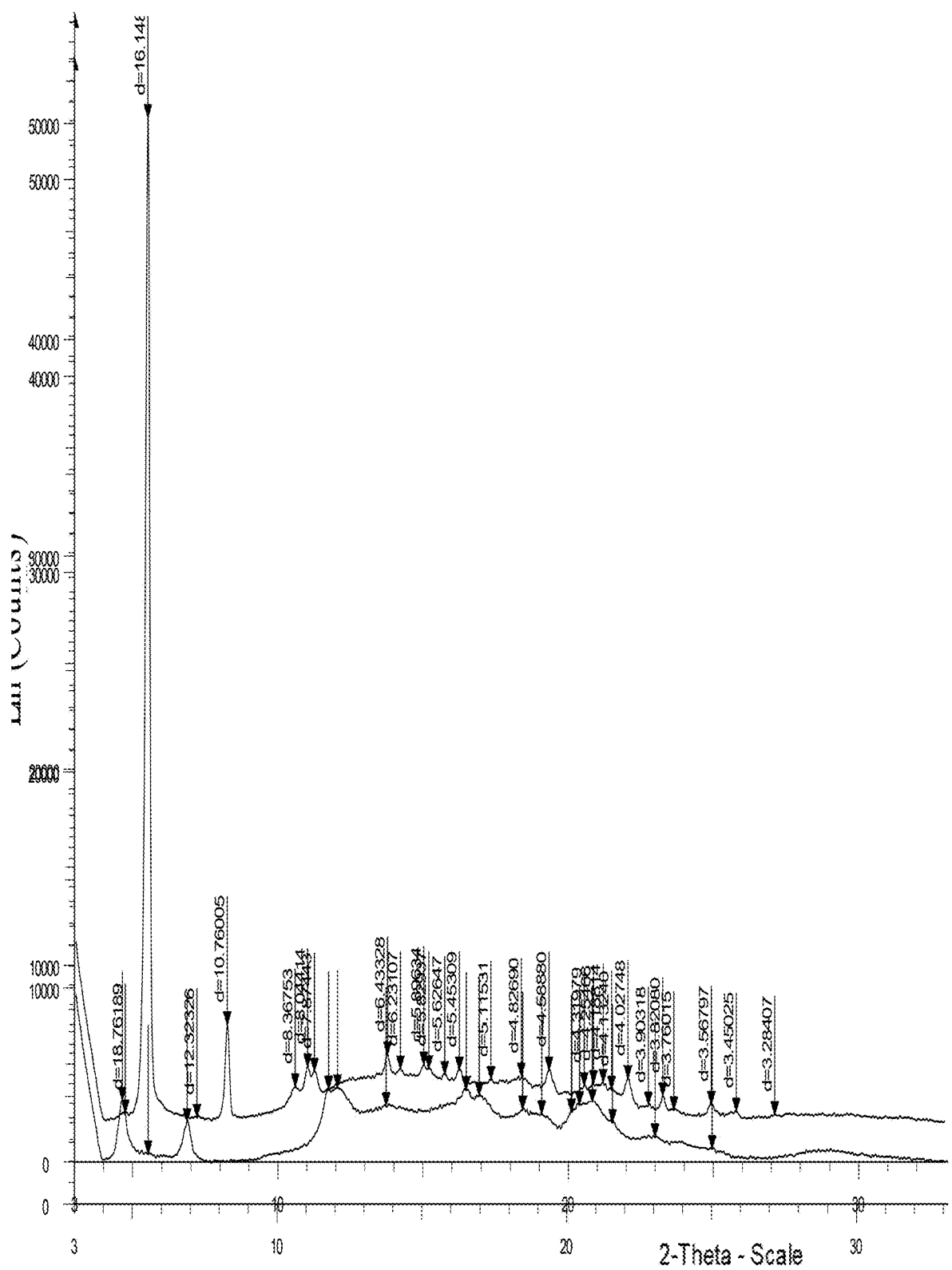
FIG. 12 is a graph showing the difference in the XRD pattern between a crystal form I (bottom, black) and a crystal form II (top, orange) before a stability test under thermal stress conditions.

FIG. 12 is a graph showing the difference in the XRD pattern between a crystal form I (bottom, black) and a crystal form II (top, orange) before a stability test under thermal stress conditions.

Figure 13:
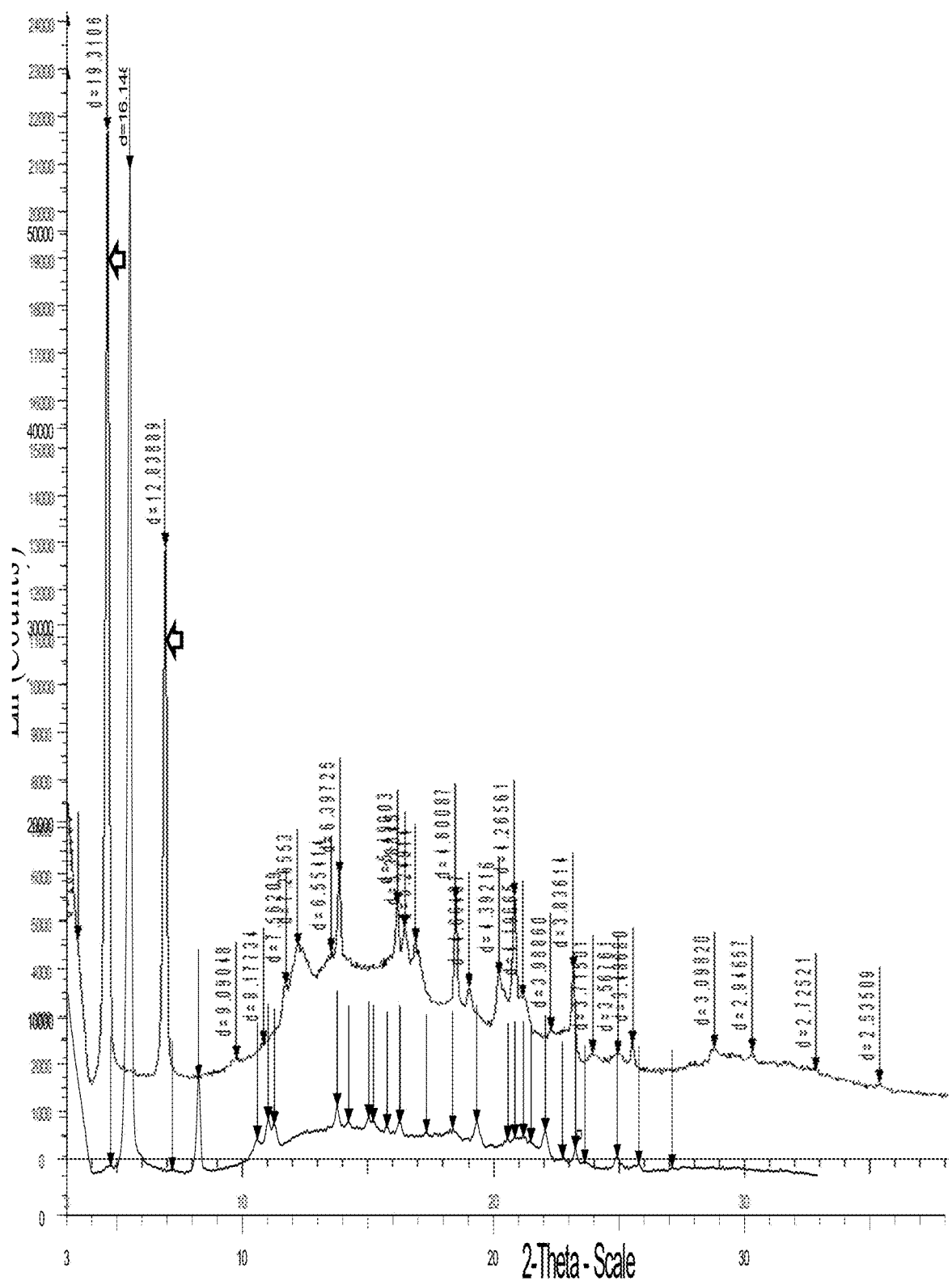
FIG. 13 is a graph showing the change in the XRD pattern of a crystal form II before (bottom, black) and after (top, orange) a stability test under thermal stress conditions.

FIG. 13 is a graph showing the change in the XRD pattern of a crystal form II before (bottom, black) and after (top, orange) a stability test under thermal stress conditions.

Figure 14:
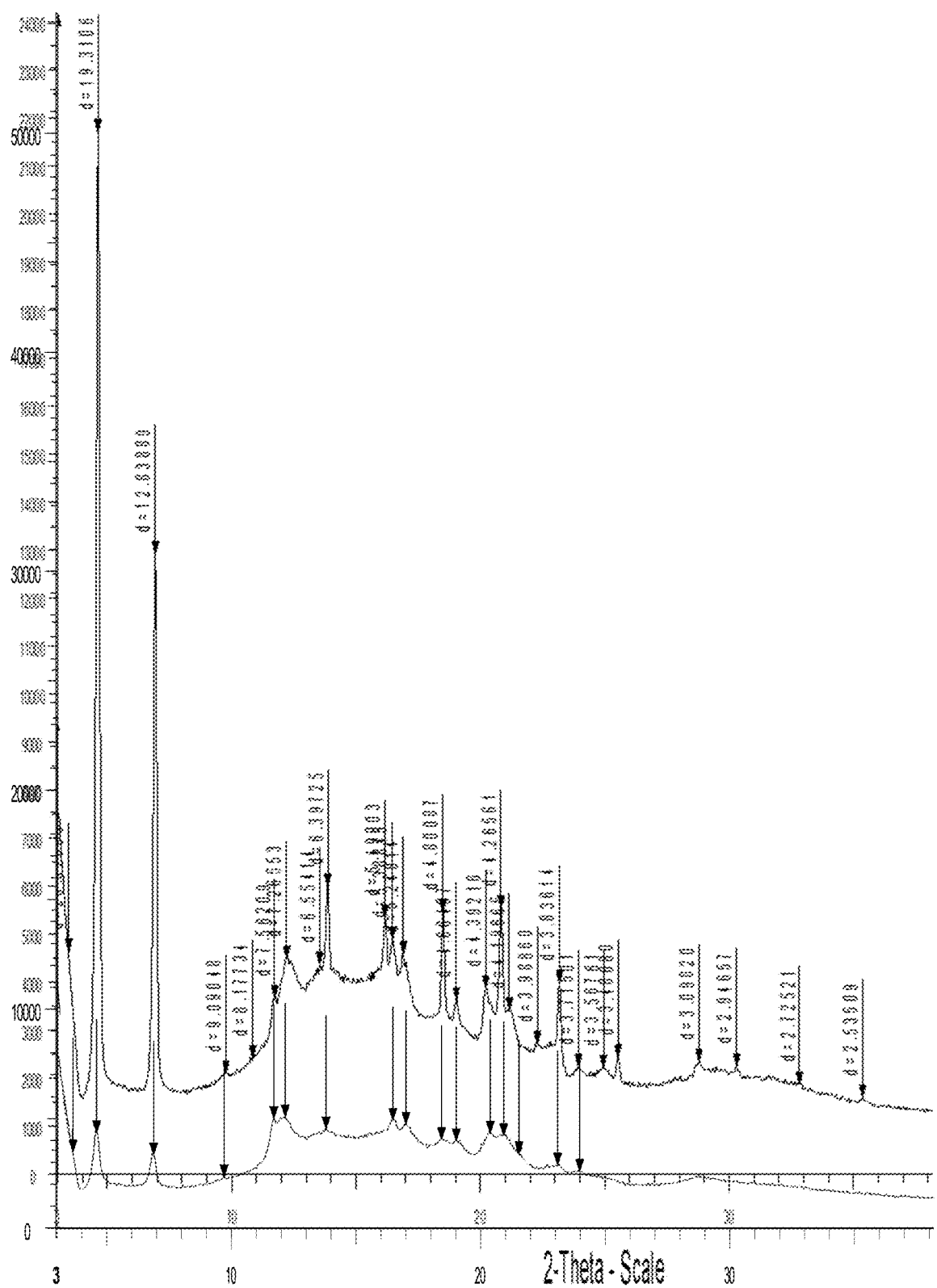
FIG. 14 is a graph of comparing the difference between the XRD pattern of a crystal form I before a stability test under thermal stress conditions (bottom, black) and the XRD pattern of a crystal form II after a stability test under thermal stress conditions (top, orange).

FIG. 14 is a graph of comparing the difference between the XRD pattern of a crystal form I before a stability test under thermal stress conditions (bottom, black) and the XRD pattern of a crystal form II after a stability test under thermal stress conditions (top, orange).

The crystal form I showed no significant change in XRD pattern peak, whereas the crystal form II showed the shifting of specific peaks. That is, it was shown that the crystal form II was converted to the crystal form I due to heat.

Experimental Example 8: Compressibility Test

Since a drug that causes a lot of static electricity has difficulty in handling and compressing to form a tablet when formulated, it is very difficult to implement a preparation with a uniform drug content. Accordingly, in relation to the static electricity-inducing capability and flowability of the three types of crystal form I, crystal form II, and the amorphous form, the compressibility of each preparation containing these drugs was examined.

The Carr index is used as an indication of the compressibility of a preparation and is related to convenience in formulation, that is, static electricity-inducing capability, flowability, and uniformity of drug content.

The Carr Index (CI) is calculated as follows.

CI=100×(1−BD/TD)

BD: bulk density, TD: tapped density

The Hausner ratio (Hr) is also an indication related to the flowability of a powder or granular drug.

The Hausner ratio (Hr) is calculated as follows.

Hr=TD/BD

As a result of the test, the bulk density and tapped density of the crystal form I, the crystal form II, and the amorphous form were obtained and summarized in Table 4, through which the Carr Index (CI) and Hausner ratio (Hr) were obtained, and based on the criteria in Table 5, the evaluation results for the Carr Index (CI), Hausner ratio (Hr), and flowability are shown in Table 6.

TABLE 4

Bulk density and tapped density

| Crystal forms | Bulk density | | | | Tapped density | | | |
|---|---|---|---|---|---|---|---|---|
| | Weight of empty container | Weight of container filled with substance | Weight of substance | BD | Weight of empty container | Weight of container filled with substance | Weight of substance | TD |
| I | 22.46 | 26.27 | 3.81 | 0.381 | 22.46 | 26.86 | 4.4 | 0.44 |
| II | 22.45 | 23.81 | 1.36 | 0.136 | 22.45 | 25.41 | 2.96 | 0.296 |
| Amorphous form | 21.97 | 25.5 | 3.53 | 0.353 | 21.03 | 25.36 | 4.33 | 0.433 |

TABLE 5

| Carr's compressibility index (%) | Hausner ratio | Description of flow |
|---|---|---|
| <10 | 1.00-1.11 | Excellent |
| 11-15 | 1.12-1.18 | Good |
| 16-20 | 1.19-1.25 | Fair |
| 21-25 | 1.26-1.34 | Passable |
| 26-31 | 1.35-1.45 | Poor |
| 32-39 | 1.46-1.59 | Very Poor |
| >40 | >1.60 | Very, very poor |

TABLE 6

Carr Index (CI) and Hausner ratio (Hr)

| Crystal forms | CI | Hr | Description of flow |
|---|---|---|---|
| I | 13.41 | 1.15 | Good |
| II | 54.05 | 2.18 | Very, very poor |
| Amorphous form | 18.48 | 1.23 | Fair |

There was no significant difference between the crystal forms I and II in the thermal stress stability test, but in the compressibility test, the crystal form II excessively caused static electricity, and thus it was difficult to even fill a die for tableting, and it showed very poor compressibility test results.

Experimental Example 9: Storage Stability Test

In order to confirm stability when the crystal form I, crystal form II, and amorphous form of a compound of Chemical Formula 1 were formulated, powder obtained by mixing 50 mg of each sample, 149 mg of microcrystalline cellulose, and 1 mg of light anhydrous silicic acid was input into a brown glass bottle and allowed to stand in a stability chamber set under conditions of 60° C. and 75% RH, and the sample was taken out after 2 weeks, 4 weeks, 8 weeks had elapsed to confirm the purity of the compound of Chemical Formula 1 over time.

When the storage period for each storage condition was reached, 35 mg of the compound of Chemical Formula 1 was taken from each sample, input into a 50 mL volumetric flask, dissolved with an appropriate amount of diluent, and marked. The resulting solution was input into a glass centrifuge tube and centrifuged at 3,000 rpm and 5° C. for 10 minutes. The sample was taken using a glass pipette and input into a HPLC vial for analysis.

As a result, as shown in Table 7, it was confirmed that the purity of the compound of Chemical Formula 1 was decreased in the order of the crystal form I, the crystal form II, and the amorphous form, and thus the crystal form I of the compound was the stablest.

TABLE 7

Test for confirming storage stability

| No. | Sample | Purity (%) | | | | Purity change (%) Week 8 − Initial |
|---|---|---|---|---|---|---|
| | | Initial | Week 2 | Week 4 | Week 8 | |
| 1 | Crystal form I | 100.2 | 101.8 | 100.9 | 99.9 | −0.3 |
| 2 | Crystal form II | 99.1 | 96.2 | 92.3 | 88 | −11.1 |

TABLE 7-continued

Test for confirming storage stability

| No. | Sample | Purity (%) Initial | Week 2 | Week 4 | Week 8 | Purity change (%) Week 8 − Initial |
|---|---|---|---|---|---|---|
| 3 | Amorphous form | 100.6 | 91.5 | 86.8 | 77.5 | −23.1 |

In conclusion, it was confirmed that the crystal form I exhibited more excellent physicochemical properties in terms of thermal stability, static electricity-inducing capability, compressibility, storage stability, and the like compared to the amorphous form or the crystal form II.

The invention claimed is:

1. A crystal form I of a compound of Chemical Formula 1,

[Chemical Formula 1]

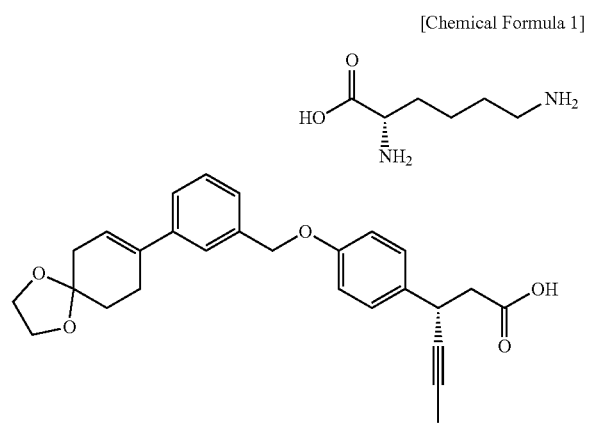 [SMILES: NCCCC[C@H](N)C(=O)O ; CC#C[C@@H](CC(=O)O)c1ccc(OCc2cccc(C3=CCC4(CC3)OCCO4)c2)cc1]

wherein the crystal form exhibits an X-ray powder diffraction pattern having 4 or more diffraction peaks at 2[θ] values selected from 4.61±0.2, 5.49±0.2, 6.84±0.2, 11.74±0.2, 12.05±0.2, 13.74±0.2, 16.50±0.2, 16.94±0.2, 18.45±0.2, 19.11±0.2, 20.13±0.2, 20.42±0.2, 20.87±0.2, 21.57±0.2, 23.04±0.2, and 25.02±0.2.

2. The crystal form of claim 1, wherein the X-ray powder diffraction pattern has diffraction peaks at 2[θ] values selected from 4.61±0.2, 6.84±0.2, 11.74±0.2, 16.50±0.2, 16.94±0.2, 20.42±0.2, and 20.87±0.2.

3. The crystal form of claim 1, wherein the crystal form exhibits an X-ray powder diffraction pattern where the positions of peaks match the peak positions listed in the following table:

| Caption | Angle 2-Theta ° | d value Angstrom | Intensity Count | Intensity % % |
|---|---|---|---|---|
| d = 19.14506 | 4.612 | 19.14506 | 4735 | 89.4 |
| d = 16.07776 | 5.492 | 16.07776 | 2226 | 42 |
| d = 12.91070 | 6.841 | 12.9107 | 3738 | 70.6 |
| d = 7.53027 | 11.743 | 7.53027 | 5231 | 98.8 |
| d = 7.33717 | 12.053 | 7.33717 | 5296 | 100 |
| d = 6.44222 | 13.735 | 6.44222 | 4485 | 84.7 |
| d = 5.36804 | 16.501 | 5.36804 | 5215 | 98.5 |
| d = 5.22939 | 16.941 | 5.22939 | 4947 | 93.4 |
| d = 4.80573 | 18.447 | 4.80573 | 4289 | 81 |
| d = 4.64015 | 19.112 | 4.64015 | 4100 | 77.4 |
| d = 4.40719 | 20.132 | 4.40719 | 4188 | 79.1 |
| d = 4.34614 | 20.418 | 4.34614 | 4519 | 85.3 |
| d = 4.25406 | 20.865 | 4.25406 | 4692 | 88.6 |
| d = 4.11754 | 21.565 | 4.11754 | 3688 | 69.6 |
| d = 3.85747 | 23.038 | 3.85747 | 3021 | 57 |
| d = 3.55665 | 25.016 | 3.55665 | 2478 | 46.8. |

4. A method of preparing the crystal form I of Chemical Formula 1 according to claim 1, the method comprising dissolving (3S)-3-(4-(3-(1,4-dioxaspiro[4,5]dec-7-en-8-yl)benzyloxy)phenyl)hex-4-inoic acid and an L-lysine salt in methanol, adding isopropyl acetate, and obtaining a crystal form I of a compound of Chemical Formula 1 from the reaction product.

5. A method for preventing or treating a metabolic disease, comprising:
administering to a subject in need thereof a therapeutically effective amount of the crystal form I of Chemical Formula 1 according to claim 1 and a pharmaceutically acceptable carrier.

6. The method of claim 5, wherein the metabolic disease is any one selected from the group consisting of obesity, type I diabetes, type II diabetes, impaired glucose tolerance, insulin resistance, hyperglycemia, hyperlipidemia, hypertriglyceridemia, hypercholesterolemia, dyslipidemia, and syndrome X.

7. A method for preventing or treating a metabolic disease, comprising:
administering to a subject in need thereof a therapeutically effective amount of the crystal form I of Chemical Formula 1 according to claim 2 and a pharmaceutically acceptable carrier.

8. The method of claim 7, wherein the metabolic disease is any one selected from the group consisting of obesity, type I diabetes, type II diabetes, impaired glucose tolerance, insulin resistance, hyperglycemia, hyperlipidemia, hypertriglyceridemia, hypercholesterolemia, dyslipidemia, and syndrome X.

9. A method for preventing or treating a metabolic disease, comprising:
administering to a subject in need thereof a therapeutically effective amount of the crystal form I of Chemical Formula 1 according to claim 3 and a pharmaceutically acceptable carrier.

10. The method of claim 9, wherein the metabolic disease is any one selected from the group consisting of obesity, type I diabetes, type II diabetes, impaired glucose tolerance, insulin resistance, hyperglycemia, hyperlipidemia, hypertriglyceridemia, hypercholesterolemia, dyslipidemia, and syndrome X.

11. A pharmaceutical composition comprising the crystal form I of Chemical Formula 1 according to claim 1 as an effective ingredient and a pharmaceutically acceptable carrier.

* * * * *